US012537181B2

(12) United States Patent
Cao et al.

(10) Patent No.: US 12,537,181 B2
(45) Date of Patent: Jan. 27, 2026

(54) ION TRAP CHIP AND SYSTEM

(71) Applicant: HUAWEI TECHNOLOGIES CO., LTD., Guangdong (CN)

(72) Inventors: Dongyang Cao, Shenzhen (CN); Jian Pan, Shenzhen (CN); Yuping Wu, Shenzhen (CN); Yongjing Cai, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 740 days.

(21) Appl. No.: 17/837,761

(22) Filed: Jun. 10, 2022

(65) Prior Publication Data

US 2022/0328296 A1 Oct. 13, 2022

Related U.S. Application Data

(63) Continuation of application No. PCT/CN2020/135579, filed on Dec. 11, 2020.

(30) Foreign Application Priority Data

Dec. 13, 2019 (CN) .......................... 201911280556.X

(51) Int. Cl.
*H01J 49/00* (2006.01)
*G06N 10/20* (2022.01)

(52) U.S. Cl.
CPC .......... *H01J 49/0013* (2013.01); *G06N 10/20* (2022.01)

(58) Field of Classification Search
None
See application file for complete search history.

(56) References Cited

U.S. PATENT DOCUMENTS

| 5,793,091 | A | 8/1998 | Devoe |
| 7,411,187 | B2 | 8/2008 | Monroe et al. |
| 7,518,120 | B2 | 4/2009 | Monroe et al. |
| 11,150,609 | B1 * | 10/2021 | Parazzoli ............. G02F 1/0356 |
| 2006/0249670 | A1 * | 11/2006 | Monroe ................ B82Y 10/00 |
| | | | 250/283 |

(Continued)

FOREIGN PATENT DOCUMENTS

| CN | 106529681 A | 3/2017 |
| CN | 107077643 A | 8/2017 |

(Continued)

OTHER PUBLICATIONS

Bruzewicz et al, "Dual-Species, Multi-Qubit Logic Primitives For Ca+/Sr+ Trapped-ion Crystals," NPJ Quantum Information, Nov. 21, 2019, 10 pages.

(Continued)

*Primary Examiner* — James Choi
(74) *Attorney, Agent, or Firm* — Fish & Richardson P.C.

(57) ABSTRACT

Example ion trap chips and quantum computing methods are described. One example ion trap chip includes a plurality of first ion traps and a plurality of second ion traps. Each first ion trap is configured to store an operation ion, where two adjacent first ion traps form one ion trap group. Each second ion trap corresponds to one ion trap group. Each second ion trap is configured to perform quantum operations of operation ions stored in a corresponding ion trap group, and each second ion trap is located between two first ion traps in a corresponding ion trap group. Operation ions stored in first ion traps in an ion trap group are transported to a corresponding second ion trap along a straight line.

19 Claims, 6 Drawing Sheets

(56) References Cited

U.S. PATENT DOCUMENTS

| | | | |
|---|---|---|---|
| 2007/0040113 A1 | 2/2007 | Monroe et al. | |
| 2007/0252081 A1 | 11/2007 | Munro et al. | |
| 2008/0185576 A1 | 8/2008 | Hollenberg et al. | |
| 2009/0070402 A1 | 3/2009 | Rose et al. | |
| 2011/0290995 A1* | 12/2011 | Kumph | H01J 49/0018 |
| | | | 250/282 |
| 2016/0222039 A1 | 8/2016 | Sum et al. | |
| 2019/0027355 A1 | 1/2019 | Kim et al. | |
| 2023/0325698 A1* | 10/2023 | Furtner | G06N 10/40 |
| | | | 716/100 |

FOREIGN PATENT DOCUMENTS

| | | |
|---|---|---|
| CN | 109858628 A | 6/2019 |
| DE | 102004031250 A1 | 1/2006 |

OTHER PUBLICATIONS

Mourik et al, "Coherent Rotations Of Qubits Within A Multi-Species Ion-Trap Quantum Computer," Jan. 8, 2020, arXiv:2001.02440v1, 18 pages.

International Search Report and Written Opinion in International Appln. No. PCT/CN2020/135579, mailed on Feb. 25, 2021, 14 pages (with English translation).

Kielpinski et al., "Architecture for a large-scale ion-trap quantum computer," Nature, Jun. 13, 2002, 417(6890):709-11.

Bruzewicz et al., "Trapped-ion quantum computing: Progress and challenges," Applied Physics Reviews, Apr. 8, 2019, 6(2):021314, 15 pages.

Extended European Search Report in European Appln. No. 20899116.6, mailed on Dec. 23, 2022, 14 pages.

* cited by examiner

ION TRAP CHIP AND SYSTEM

CROSS-REFERENCE TO RELATED APPLICATIONS

This application is a continuation of International Application No. PCT/CN2020/135579, filed on Dec. 11, 2020, which claims priority to Chinese Patent Application No. 201911280556.X, filed on Dec. 13, 2019. The disclosures of the aforementioned applications are hereby incorporated by reference in their entireties.

TECHNICAL FIELD

This application relates to the field of quantum computing, and in particular, to an ion trap chip and a system.

BACKGROUND

An ion trap system is considered as one of hardware systems that are most likely to implement a quantum computer. The ion trap system has mans' advantages such as high fidelity of a quantum gate operation and a long coherence time, but also has problems such as poor scalability and excessively complex and unstable laser control. In addition, a current ion trap quantum computing system does not have a capability of parallel quantum operations.

Currently, a conventional one-dimensional ion chain can store about 50 ions at a normal temperature. If a 4k low-temperature design is used, a quantity of ions may be increased to 100. However, it is almost impossible for this structure to store more than 100 ions at the same time. More importantly, more ions in the one-dimensional chain indicate lower precision of quantum operations between ions. When the quantity of ions reaches 50, the precision cannot meet requirements of quantum computing.

In view of the foregoing problems, a two-dimensional ion trap lattice method is proposed in the academic field to resolve problems of decrease in fidelity and incapability of parallel operations. How-ever, coupling between ions is excessively weak in the two-dimensional ion trap lattice method. This greatly reduces a speed of a quantum logic gate. In addition, a requirement on control precision of an electrode voltage is excessively high. Consequently, actual fidelity is greatly lower than fidelity predicted in theory. To resolve a problem of weak interaction between ions, an ion transport solution is proposed based on the two-dimensional ion trap lattice method. In this solution, ions are no longer fixed in an ion trap, but are moved, by changing an electrode voltage, to an ion trap that needs the ions; and a quantum gate operation is then performed. In this way, problems of a long distance and weak coupling between ions are avoided. However, the ions are gradually heated during repeated moving. Especially, the ions are greatly heated when moving in a 90° turning manner. Consequently, the ions have excessively high kinetic energy, and jump out of the ion trap. This causes an ion loss, and greatly reduces working efficiency of the ion trap system. How to improve the working efficiency of the ion trap system is an urgent problem to be solved.

SUMMARY

This application provides an ion trap chip and a system. In the ion trap chip, an ion storage area and a quantum operation area are separated, and the ion storage area and the corresponding quantum operation area are located in a same straight line, so that ion transport does not require a turning. This greatly improves quantum computing efficiency.

According to a first aspect, an ion trap chip is provided, including: a plurality of first ion traps, each configured to store an operation ion, where two adjacent first ion traps form one ion trap group; and a plurality of second ion traps, where the second ion trap corresponds to one ion trap group, the second ion trap is configured to perform quantum operations of operation ions stored in the corresponding ion trap group, and the second ion trap is located between two first ion traps in the corresponding ion trap group. The operation ions stored in the first ion traps in the ion trap group are transported to the corresponding second ion trap along a straight line.

According to this embodiment of this application, two adjacent first ion traps form one ion trap group, and the second ion trap corresponds to one ion trap group. The second ion trap may be located between the two first ion traps in the corresponding ion trap group, so that a transport route for transporting an operation ion from the first ion trap to the corresponding second ion trap is a straight line without a turning. This can effectively improve quantum computing efficiency.

With reference to the first aspect, in some implementations of the first aspect, the ion trap chip further includes a plurality of ion channels. The ion channel is located between the second ion trap and the first ion trap in the corresponding ion trap group, and is used for transporting the operation ions in the corresponding ion trap group.

According to this embodiment of this application, when the first ion trap in the ion trap group is far away from the corresponding second ion trap, the ion channel may be disposed between the first ion trap and the corresponding second ion trap, to ensure normal transport of the operation ion.

With reference to the first aspect, in some implementations of the first aspect, the first ion trap is further configured to store an ancillary ion.

With reference to the first aspect, in some implementations of the first aspect, the ion trap chip further includes a substrate. The plurality of first ion traps, the plurality of second ion traps, and the plurality of ion channels are all located on a surface of the substrate. The ion trap chip further includes a plurality of first optical waveguides, located inside the substrate. The plurality of first optical waveguides are configured to transmit a cooling laser to irradiate the ancillary ion.

According to this embodiment of this application, the first ion trap may be further configured to store the ancillary ion. After the operation ion completes a quantum operation and returns to the first ion trap, the first optical waveguide may transmit the cooling laser to irradiate the ancillary ion, to implement cooperative cooling. Because the cooling laser is not directly irradiated on the operation ion, a quantum state of the operation ion can be prevented from being damaged.

With reference to the first aspect, in some implementations of the first aspect, the ancillary ion is a strontium ion or a barium ion.

According to this embodiment of this application, the ancillary ion may be an ion with a longer S-P transition wavelength, for example, a barium ion or a strontium ion.

With reference to the first aspect, in some implementations of the first aspect, the substrate is prepared by stacking a plurality of silicon dioxide baseboards, and the plurality of first optical waveguides are located between any two adjacent silicon dioxide baseboards.

According to this embodiment of this application, the baseboards of the ion trap chip may be a plurality of silicon dioxide baseboards, and laser transmission can be implemented due to light transmission of silicon dioxide. In addition, because the first optical waveguide is disposed inside the ion trap chip, density of electrodes on a surface of the ion trap chip can be increased.

With reference to the first aspect, in some implementations of the first aspect, the first ion trap includes at least one first alternating current electrode and a plurality of first direct current electrodes. The at least one first alternating current electrode and the plurality of first direct current electrodes are located on the surface of the substrate, and the plurality of first direct current electrodes are located around the at least one first alternating current electrode. The at least one first alternating current electrode and the plurality of first direct current electrodes are configured to store the operation ion and the ancillary ion. The plurality of first direct current electrodes are further configured to control the operation ion and the ancillary ion to rotate, so that the operation ion rotates to a target direction.

According to this embodiment of this application, the at least one first alternating current electrode and the plurality of first direct current electrodes may form a low point of electric potential energy, to store the operation ion and the ancillary ion. In addition, when a quantum operation needs to be performed, directions of the operation ion and the ancillary ion may be rotated by using the first direct current electrodes.

With reference to the first aspect, in some implementations of the first aspect, the ion trap chip further includes a substrate. The plurality of first ion traps, the plurality of second ion traps, and the plurality of ion channels are all located on a surface of the substrate. The plurality of second direct current electrodes are located on two sides of the at least one second alternating current electrode. The ion trap chip further includes: a plurality of second optical waveguides, located inside the substrate. The plurality of second optical waveguides are configured to transmit an operation laser to irradiate the operation ions in the second ion trap.

According to this embodiment of this application, the ion trap chip may further include the second optical waveguides, configured to transmit the operation laser when the operation ions in the second ion trap perform quantum operations.

With reference to the first aspect, in some implementations of the first aspect, the substrate is prepared by stacking a plurality of silicon dioxide baseboards, and the plurality of second optical waveguides are located between any two adjacent silicon dioxide baseboards.

According to this embodiment of this application, the baseboards of the ion trap chip may be a plurality of silicon dioxide baseboards, and laser transmission can be implemented due to light transmission of silicon dioxide. In addition, because the second optical waveguide is disposed inside the ion trap chip, density of electrodes on a surface of the ion trap chip can be increased.

With reference to the first aspect, in some implementations of the first aspect, the second ion trap includes at least one second alternating current electrode and a plurality of second direct current electrodes. The at least one second alternating current electrode and the plurality of second direct current electrodes are located on the surface of the substrate. The at least one second alternating current electrode and the plurality of second direct current electrodes are configured to store the operation ions in the second ion trap. The plurality of second direct current electrodes are further configured to transport the operation ions in the second ion trap.

According to this embodiment of this application, the at least one second alternating current electrode and the plurality of second direct current electrodes may be configured to store the operation ion that performs the quantum operation in the second ion trap. After the quantum operation ends, the plurality of second direct current electrodes may transport the operation ion back to the first ion trap.

With reference to the first aspect, in some implementations of the first aspect, the operation ion is a calcium ion or a beryllium ion.

According to this embodiment of this application, an ion having a better ground-state energy level structure, such as a calcium ion or a beryllium ion, may be selected as the operation ion.

With reference to the first aspect, in some implementations of the first aspect, a center of the second ion trap is a midpoint of a connection line between the two first ion traps in the corresponding ion trap group.

According to this embodiment of this application, the center of the second ion trap is the midpoint of the connection line between the two first ion traps in the corresponding ion trap group, so that operation ions in the two first ion traps arrive at the center at the same time.

According to a second aspect, a quantum computing method is provided, and is applied to an ion trap chip. The ion trap chip includes a plurality of first ion traps, a plurality of second ion traps, a plurality of first optical waveguides, and a plurality of second optical waveguides. Two adjacent first ion traps that can perform quantum operations form one ion trap group, and the second ion trap corresponds to one ion trap group. Operation ions stored in the first ion traps in the ion trap group are transported to the corresponding second ion trap along a straight line. The first ion trap includes a plurality of first direct current electrodes, and the second ion trap includes a plurality of second direct current electrodes. The method includes: The plurality of first direct current electrodes output voltages to transport an operation ion in the first ion trap to the corresponding second ion trap. The second optical waveguide transmits an operation laser to irradiate the operation ion. The plurality of second direct current electrodes output voltages to transport the operation ion in the corresponding second ion trap to the first ion trap.

With reference to the second aspect, in some implementations of the second aspect, after the transporting the operation ion in the corresponding second ion trap to the first ion trap, the method further includes: reading a quantum state of the operation ion.

With reference to the second aspect, in some implementations of the second aspect, the first ion trap is further configured to store an ancillary ion. That the plurality of first direct current electrodes output voltages to transport an operation ion in the first ion trap to the corresponding second ion trap includes: The plurality of first direct current electrodes output the voltages, to rotate the ancillary ion and the operation ion, so that the operation ion rotates to a target direction and is transported to the corresponding second ion trap along the target direction.

With reference to the second aspect, in some implementations of the second aspect, after the plurality of second direct current electrodes output voltages to transport the operation ion in the corresponding second ion trap to the first ion trap, the first optical waveguide transmits a cooling laser to irradiate the ancillary ion.

According to a third aspect, a computer storage medium is provided. The computer storage medium stores computer-executable instructions. When the computer-executable instructions are invoked by a computer, the computer is enabled to perform the method according to the second aspect.

According to a fourth aspect, a quantum computing system is provided. The quantum computing system includes at least one ion trap chip according to the first aspect and at least one controller. The at least one controller is configured to control the ion trap chip.

BRIEF DESCRIPTION OF DRAWINGS

FIG. 1 is a schematic diagram of a quantum computing method according to an embodiment of this application;

DESCRIPTION OF EMBODIMENTS

The following describes technical solutions of this application with reference to the accompanying drawings.

Figure 1:
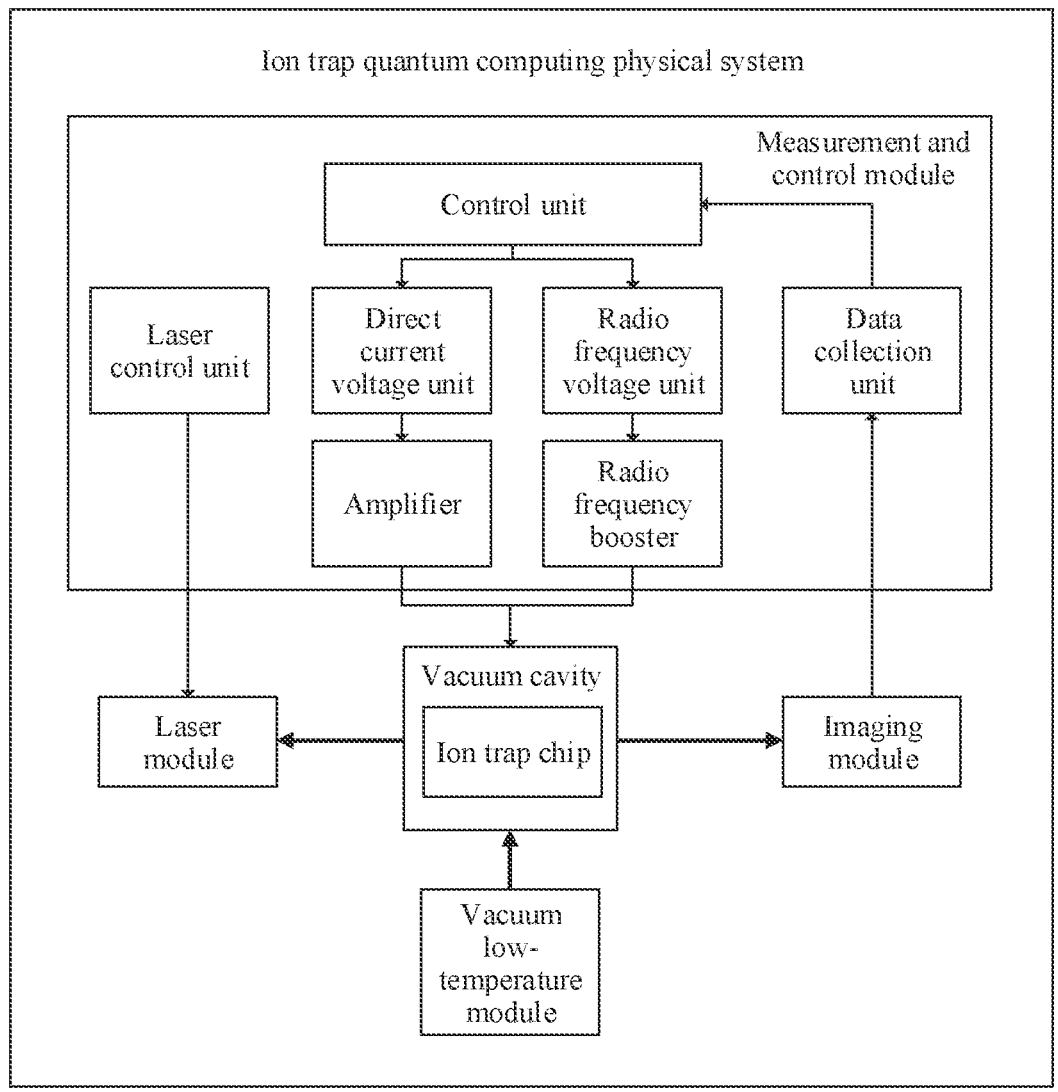
FIG. 1 is a schematic diagram of an architecture; of a quantum computing system applicable to an embodiment of this application.

FIG. 1 is a schematic diagram of an architecture of a quantum computing system applicable to this application.

As shown in FIG. 1, a module architecture in this embodiment of this application mainly includes an ion trap chip, a vacuum low-temperature module, a laser module, an imaging module, and a measurement and control module. The measurement and control module may be configured to measure and control working statuses of the ion trap chip, the vacuum low-temperature module, the laser module, and the imaging module. The measurement and control module may include a control unit, a laser control unit, a voltage unit, a radio frequency voltage unit, a data collection unit, an amplifier, and a radio frequency booster. In addition, the measurement and control module may include a memory, configured to store control software.

The ion trap chip is a core of ion trap quantum computing, and mainly includes a series of metal electrodes. A voltage unit, a radio frequency voltage unit, the amplifier, and the radio frequency booster in the measurement and control module perform a series of operations such as amplification, filtering, and shaping on a voltage generated by an external voltage source of the chip. Then, the voltage is applied to a plurality of electrodes of the ion trap chip, to form an electric potential field that can store charged ions in space.

It should be understood that, because an operation object is a string of charged ions, an extremely high vacuum is required in an ambient environment, to avoid a case in which high-speed moving molecules in air collide with the ions and the ions overflow an ion trap. To achieve an ultra-high vacuum environment, the control unit in the measurement and control module needs to control a vacuum pump in the vacuum low-temperature module to remove various molecules in air from an ion storage area. In addition, the ion storage area is usually cooled, so that it is a minimum probability that remaining molecules collide with the ions. After the ions are stably stored in the ion storage area, the ions need to be controlled. Generally, the laser control module in the measurement and control module needs to control the laser module to generate a plurality of beams of lasers with different wavelengths, to perform operations such as initialization, cooling, quantum control, and reading on the ions. A general method is to focus the laser on the ions for operations by using a specially designed lens, or by using a specially designed optical waveguide. After a quantum operation is completed, a state of the ion needs to be read. Currently, a general method for reading the stale of the ion is to detect a state of a photon entitled by the ion. In this case, the imaging module needs to record intensity and a location of the photon.

Optionally, the measurement and control module may be a field programmable gate array (FPGA).

Figure 2:
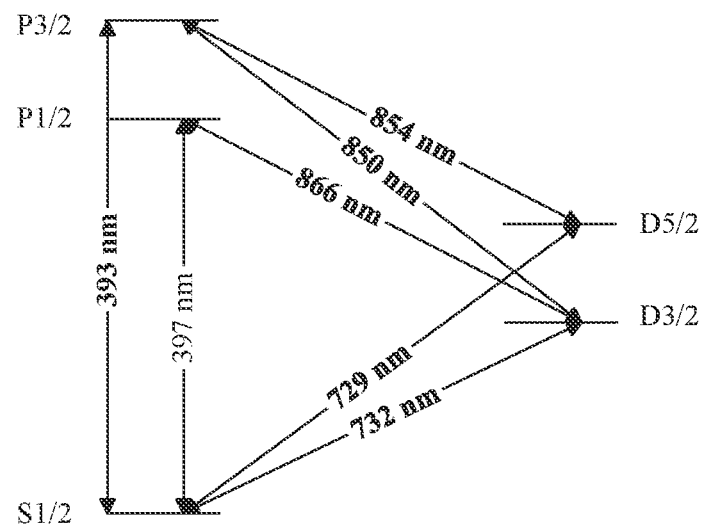
FIG. 2 is a schematic diagram of an energy level of a calcium ion.
Figure 3:
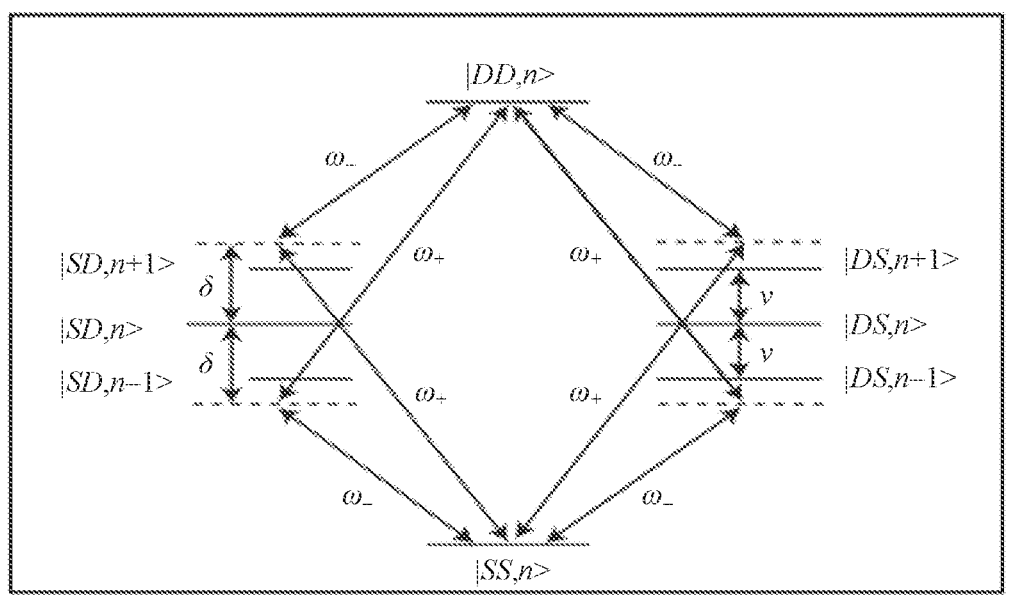
FIG. 3 is a schematic diagram of a vibration mode of a calcium ion.

After the ions stored in the ion trap are cooled by the laser, a two-bit quantum logic gate can be implemented. A basic principle is as follows: After an ion is stored in an ion trap, a quantum bit is encoded in two manners, or two degrees of freedom are used for controlling the ion. A first manner is an electronic energy level of the ion. FIG. 2 is a diagram of an energy level of a calcium (Ca) ion. A quantum bit may be encoded by using energy levels S1/2 and D5/2. A laser (729 nm laser) corresponding to an energy level gap may be used for implementing a single-bit quantum operation. The other manner is a phonon energy level, and the phonon energy level is derived from vibration of the ion. As shown in FIG. 3, a vibration mode of the ion may be any integer n, and the quantum bit may be encoded in different vibration modes (different n).

To implement a two-bit quantum logic gate between two ions in the ion trap, a quantum bit is generally encoded on an internal electron energy level of an ion, and then an external vibration of the ion is used as an auxiliary fir implementation. A specific process is as follows (as shown in FIG. 3 by using Ca ions as an example): Two calcium ions in the ion trap are prepared into ground states (SS) of the two calcium ions. In this case, vibration modes of the two calcium ions are assumed to be n. Then, lasers of about 729 nm are applied to the two Ca ions (as shown in FIG. 2). Frequencies of the two beams of lasers are respectively frequencies of increasing/decreasing a vibration mode (n+1 and n−1). After the lasers act for a specific time, the two Ca ions enter an entangled state (SS+DD), so that the two-bit quantum logic gate is implemented.

In embodiments of this application, a plurality of first ion traps configured to store ions and a plurality of second ion traps configured to perform quantum operations are designed in an ion trap chip. The first ion traps are configured to store operation ions. During operations, the operation ions in the first ion traps are transported to the second ion trap for quantum operations. After the quantum operations are completed, the operation ions return to the first ion traps. In this way, parallel quantum operations can be implemented without an ion loss, and working efficiency of an ion trap system is greatly improved.

Figure 4:
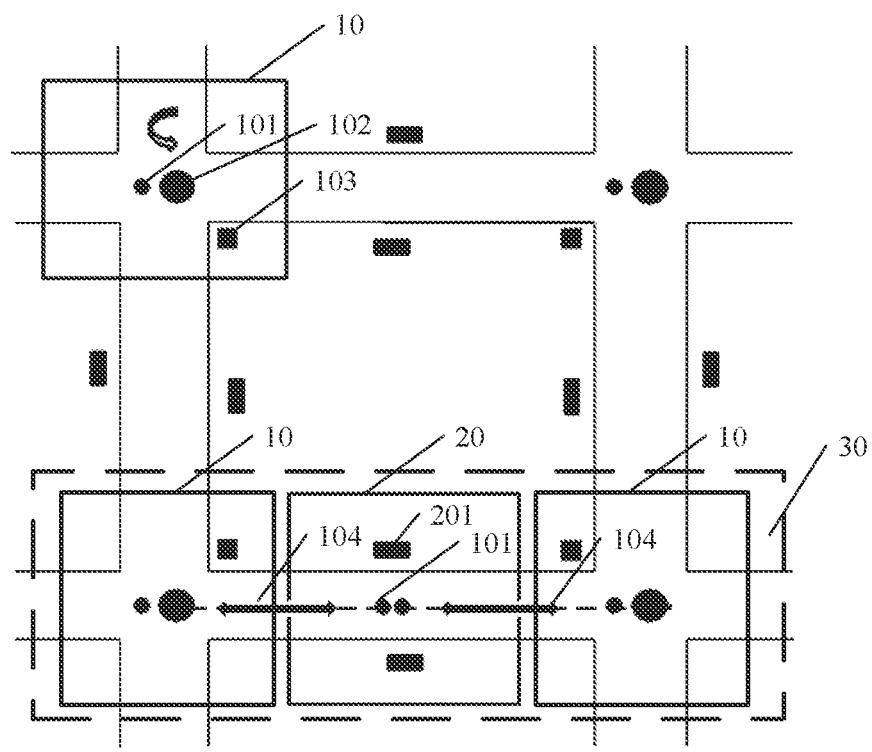
FIG. 4 is a schematic diagram of a structure of an ion trap chip according to an embodiment of this application.
Figure 5:
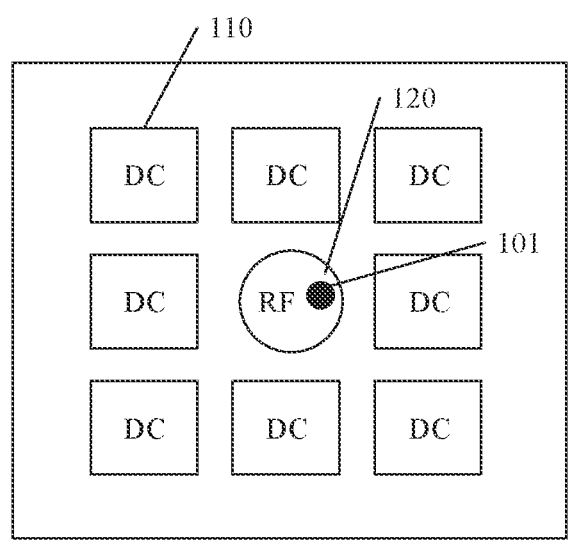
FIG. 5 is a schematic diagram of a structure of a first ion trap according to an embodiment of this application.
Figure 6:
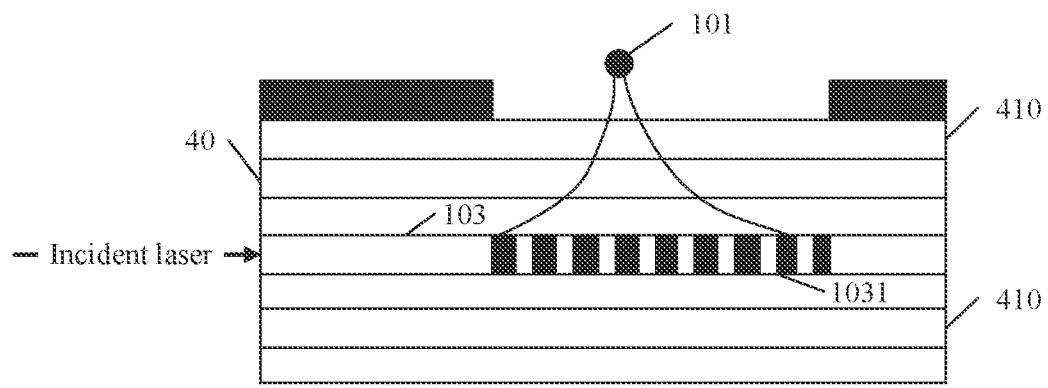
FIG. 6 is a schematic diagram of transmitting a cooling laser by a first optical waveguide according to an embodiment of this application.
Figure 7:
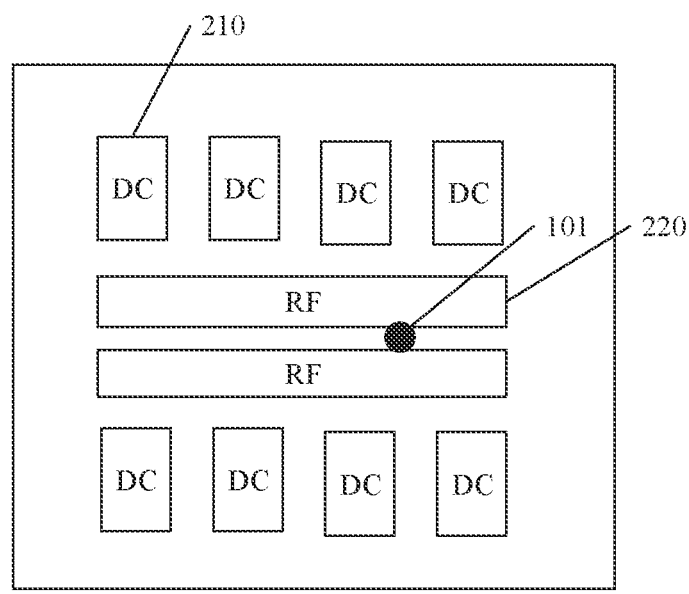
FIG. 7 is a schematic diagram of a structure of a second ion trap according to an embodiment of this application.

FIG. 4 to FIG. 7 are schematic diagrams of a structure of an ion trap chip according to an embodiment of this application. FIG. 4 is a schematic diagram of a structure of the ion trap chip. FIG. 5 is a schematic diagram of a structure of a first ion trap of the ion trap chip in FIG. 4. FIG. 6 is a schematic diagram when a first optical waveguide works. FIG. 7 is a schematic diagram of a structure of a second ion trap of the ion trap chip in FIG. 4.

As shown in FIG. 4, the ion trap chip may include a plurality of first ion traps 10 and a plurality of second ion traps 20.

The first ion trap 10 may be configured to store an operation ion 101, and two adjacent first ion traps 10 that can perform quantum operations in the plurality of first ion traps 10 form one ion trap group 30. Each second ion trap 20 corresponds to one ion trap group 30. Each second ion trap 20 is configured to perform quantum operations of operation ions 101 stored in the corresponding ion trap group 30, and may be located between two first ion traps 10. The operation ions 101 stored in the first ion traps 10 may be transported to the corresponding second ion trap 20 along a straight line.

It should be understood that the operation ion 101 may shift due to interference from an external environment in a transport process. It may be considered that the operation ion 101 moves along a straight line within a specific range. This is not limited in this application.

Optionally, the ion trap chip may further include a plurality of ion channels 104. The ion channel 104 is located between the second ion trap 20 and the first ion trap 10 in the corresponding ion trap group, and is configured to transport the operation ion 101 that moves between the first ion trap 10 and the corresponding second ion trap 20.

Optionally, the ion channel 104 may be located on a channel for transporting the operation ion 101 in the first ion trap 10 to the second ion trap 20.

Optionally, the ion channel 104 is used for transporting the operation ion 101 between the first ion trap 10 and the corresponding second ion trap 20 along a straight line. When the first ion trap 10 is far away from the corresponding second ion trap 20, the ion channel 104 may include at least one electrode located on a surface of the ion trap chip, to form an electric field and transport the operation ion 101. When the first ion trap 10 is close to the corresponding second ion trap 20, the ion channel 104 is short, and no electrode may be required.

Optionally, the second ion trap 20 may perform quantum operations of operation ions 101 stored in the corresponding ion trap group 30. The operation ions 101 may be a part of the operation ions 101 stored in the corresponding ion trap group, or all the operation ions 101 stored in the corresponding ion trap group.

A quantum operation may be performed by an operation ion in the first ion trap and an operation ion in a first ion trap adjacent to the first ion trap. Therefore, the first ion trap and the first ion trap adjacent to the first ion trap may form an ion trap group, and a quantity of adjacent first ion traps is not limited.

As shown in FIG. 5, the first ion trap 10 may include a plurality of first direct current electrodes 110 and at least one first alternating current electrode 120. The plurality of first direct current electrodes 110 may be located around the at least one first alternating current electrode 120. A quantity of first direct current electrodes 110 may vary based on a design requirement, and a quantity of at least one first alternating current electrode 120 may vary based on a design requirement. In this embodiment of this application, eight first direct current electrodes 110 and one first alternating current electrode 120 are used as an example for description. However, the quantity of first direct current electrodes 110 and the quantity of first alternating current electrodes 120 are not limited.

It should be understood that each operation ion 101 may be a bit unit in quantum computing.

A combination of the at least one first alternating current electrode 120 and the plurality of first direct current electrodes 110 may be configured to store the operation ion 101. An ion having a better ground-state energy level structure, such as a Ca ion or a beryllium (Be) ion, may be selected as the operation ion 101.

Optionally, the plurality of first direct current electrodes 110 may output first voltages, to control to accelerate and transport the operation ion 101 to a second ion trap for a quantum operation.

Optionally, the first direct current electrode 110 may be a direct current (direct current, DC) electrode.

As shown in FIG. 6, the ion trap chip may further include a substrate 40. The substrate 40 may be formed by stacking a plurality of baseboards 410 that may be connected to each other in a press-fitting or gluing manner.

Optionally, the first ion traps may be disposed on a surface of the substrate. In other words, the plurality of first direct current electrodes 110 and the at least one first alternating current electrode 120 may be located on the surface of the substrate 40.

Optionally, the plurality of ion channels may be disposed on the surface of the substrate.

Optionally, a material of the first direct current electrode 110 may be a metal such as gold (Au), silver (Ag), or copper (Cu).

Optionally, the at least one first alternating current electrode 120 may be a radio frequency (radio frequency, RF) electrode, and a material may be a metal such as Au, Ag, or Cu.

Optionally, the ion trap chip may further include first optical waveguides 103. The first optical waveguides 103 may be located inside the substrate, and may be between any two adjacent baseboards in the plurality of baseboards 410 of the substrate. As shown in FIG. 6, the first optical waveguide 103 may be configured to transmit a cooling laser after the operation ion performs a quantum operation, to cool the operation ion 101 stored in the first ion trap 10.

The first ion trap may correspond to one first optical waveguide. The first optical waveguide may be located in a projection area right below a surface area of the substrate 40 in which the first ion trap is located, to facilitate transmission of the cooling laser. In addition, a plurality of first ion traps may correspond to one first optical waveguide. The first optical waveguide may be located between projection areas of surface areas of the substrate 40 in which the plurality of first ion traps are located, and transmit the cooling laser to the plurality of first ion traps at the same time.

Optionally, the plurality of baseboards 410 of the ion trap chip may be silicon dioxide (Sift) baseboards.

Optionally, the first optical waveguide 103 may include a first grating 1031 configured to focus the cooling laser, so that the cooling laser performs irradiation at a specific angle.

Optionally, a material of the first optical waveguide 103 may be silicon nitride ($Si_3N_4$).

As shown in FIG. 6, the incident cooling laser is sent into the first ion trap through the first optical waveguide 103, and is focused above, through the first grating 1031, to an ion that needs to perform operation.

Optionally, the first ion trap 10 may be further configured to store an ancillary ion 102. In the first ion trap 10, the first optical waveguide 103 may transmit the cooling laser to irradiate the ancillary ion 102, to implement cooperative cooling on the operation ion 101. To be specific, energy of the operation ion 101 is transferred to the ancillary ion 102 through interaction. After being irradiated by the cooling laser, the ancillary ion 102 may take away the energy through the cooling laser. The interaction may be collision, electric field force, or the like. The cooling laser applied through the first optical waveguide 103 in cooperative cooling directly acts on the ancillary ion 102, and does not directly interact with the operation ion 101. In this way, damage to a quantum state of the operation ion can be avoided, and continuous non-destructive cooling on quantum bits can be implemented in a quantum computing process.

Optionally, the plurality of first direct current electrodes 110 may output first voltages, to control the operation ion 101 and the ancillary ion 102 that are stored in the first ion trap to rotate, so that the operation ion 101 rotates to a target direction and is transported to the corresponding second ion trap 20.

Optionally, the ancillary ion may be an ion with a longer S-P transition wavelength, to be specific, an ion with a longer transition wavelength generated through transfer from an S layer to a P layer of an outer electron layer of the ancillary ion, for example, a barium (Ba) ion or a strontium (Sr) ion.

Optionally, the operation ion 101 may be a Ca ion, and the ancillary ion may be a Ba ion. A frequency of the cooling laser is usually an $S_{1/2}$-$P_{1/2}$ energy level transition frequency of the ancillary ion. As shown in FIG. 2, a 397 nm laser whose wavelength is near that of ultraviolet light is required if a Ca ion is directly cooled. A laser switch wavelength cannot be transmitted by an ordinary waveguide device. If a cooperative cooling method is used, a Ba ion is used to assist in cooling a Ca ion. In this case, the laser is visible light with a wavelength of 493.5 nm, and may be transmitted to the at least one first alternating current electrode in an integrated optical waveguide manner. In a cooperative cooling manner, the Ba ion is used as a cooling bit and is cooled by a 493.5 mu laser, and the Ca ion is used as a computing bit and is controlled by a 729 nm laser.

Optionally, after the operation ion completes quantum computing, a similar method may be used for reading. A signal of the operation ion may be transferred to the ancillary Ba and laser reading is performed by using the Ba ion, to avoid using near-ultraviolet light.

As shown in FIG. 7, the second ion trap 20 may include a plurality of second direct current electrodes 210 and at least one second alternating current electrode 220. The plurality of second direct current electrodes 210 may be located on two sides of the at least one second alternating current electrode 220, and are configured to transport an operation ion 101 stored by the at least one second alternating current electrode 220. As shown in FIG. 4, the ion trap chip may further include second optical wave guides 201. The second optical waveguide 201 may be located inside a substrate, and may be between any two adjacent baseboards in a plurality of baseboards of the substrate. The second optical waveguide 201 is configured to transmit an operation laser to irradiate the operation ion in the second ion trap 20, to implement a quantum operation.

Optionally, the second ion traps may be disposed on a surface of the ion trap chip. In other words, the plurality of second direct current electrodes 210 and the at least one second alternating current electrode 220 may be located on a surface of the substrate that is of the ion trap chip and that is the same as that of the first ion trap.

Optionally, the second direct current electrode 210 may be a DC electrode.

Optionally, a mated al of the second direct current electrode 210 may be a metal such as Au, Ag, or Cu.

Optionally, the at least one second alternating current electrode 220 may be an RF electrode, and a material may be a metal such as Au, Ag, or Cu.

Optionally, the baseboard may be a silicon dioxide baseboard.

Optionally, the second ion trap 20 may correspond to at least one second optical waveguide 201. The second optical waveguide 201 may be located in a projection area right below a surface area of the substrate 40 in which the second ion trap 20 is located, to facilitate transmission of the operation laser.

Optionally, the second optical waveguide 201 may include a second grating configured to focus the operation laser, so that the operation laser performs irradiation at a specific angle.

Optionally, a material of the second optical waveguide 201 may be silicon nitride ($Si_3N_4$). The incident operation laser is sent into the second ion trap through the second optical waveguide 201, and is converged above, through the second grating, to an operation ion that performs a quantum operation.

When the operation ion in the ion trap chip is cooled in the cooperative cooling manner, because the ancillary ion and the operation ion are not ions of a same type, different optical waveguides are used in the first ion trap and the corresponding second ion trap. In this way, optical waveguides in different areas use specific wavelengths for different ions, and crosstalk caused by a diffracted laser irradiating at a spatial location adjacent to a target ion is avoided.

It should be understood that a two-dimensional ion trap chip may be considered as a two-dimensional lattice, the first ion trap is located at a location of a vertex of the lattice, and an operation and control area (the second ion trap) is located at a middle location of a side of the lattice. When operation ions do not perform quantum control, the operation ions are separately located in the cooling first ion traps that are far away from each other. In this way, there is almost no coupling effect between the operation ions. When quantum control needs to be performed, operation ions need to be first moved to the corresponding second ion trap, and then the quantum control is implemented by using the operation laser emitted from the second optical waveguide.

The first ion trap may include at least two types of ion components, and both the operation ion and the ancillary ion that are used as quantum computing bit units are bound in the first ion trap. When an ion is controlled by the at least one first alternating current electrode and the first direct current electrodes, the ion floats above the electrodes, and a direction of an axis of an ion pair is changed by adjusting a voltage of the first direct current electrode. The cooling laser may be applied to the stored ion pair through the first optical waveguide. For example, if the stored ions include an ancillary ion, the operation ion is cooled and stored by using a method in which the cooling laser irradiates the ancillary ion.

In the second ion trap, the operation ion is moved to a specific location by adjusting the second direct current electrodes, and then the operation ion that performs the quantum operation is controlled by using the at least one second alternating current electrode and the second direct current electrodes. The operation laser is applied to an operation ion pair in the second ion trap through the second optical waveguide, to implement single-bit or two-bit quantum control. When the control is completed, the operation ion is moved to the first ion trap again, and waits for next computing control.

The operation ion in the first ion trap may perform a two-bit logic gate operation with four adjacent operation ions. Two adjacent quantum bits may be moved to a quantum control area in the middle by controlling voltages on the electrodes. In this case, the two adjacent quantum bits are very close to each other, and a coupling effect is generated between the bits, so that efficient two-bit logic gate control is implemented.

Figure 8:
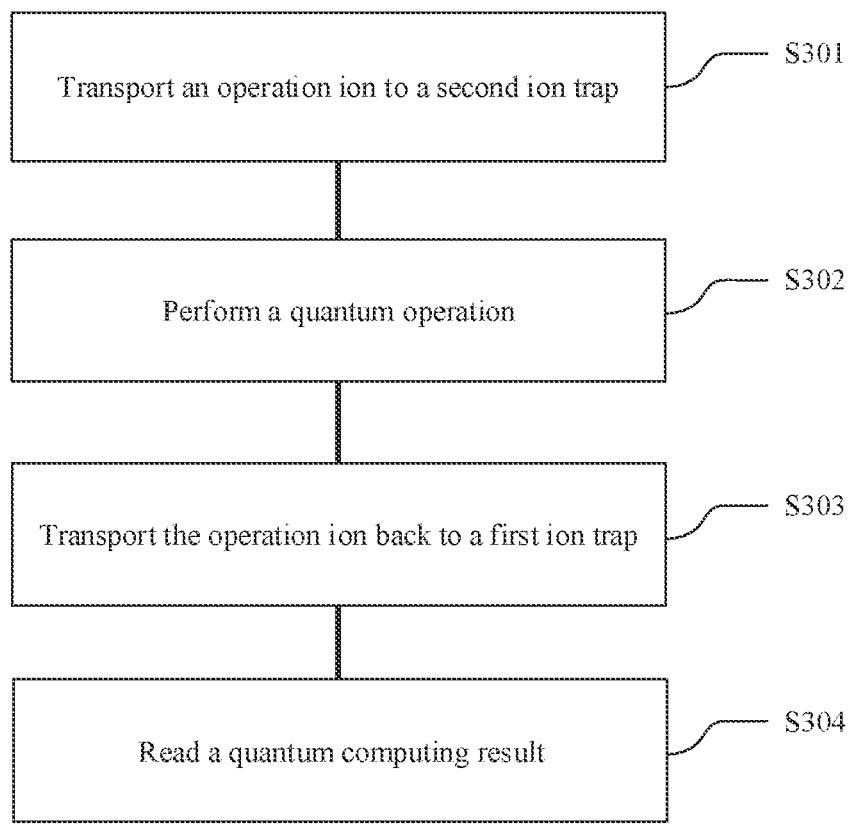

FIG. 8 is a schematic diagram of a quantum computing method according to an embodiment of this application.

S301: A plurality of first direct current electrodes in a first ion trap output voltages, to transport an operation ion stored in the first ion trap to a corresponding second ion trap.

Optionally, the first ion trap may further store an ancillary ion. The method may further include: The plurality of first direct current electrodes output voltages to control the operation ion and the ancillary ion to rotate, so that the operation ion rotates to a target direction and is transported to the corresponding second ion trap for a quantum operation.

S302: A second optical waveguide transmits an operation laser to irradiate the operation ion, so that the operation ion performs the quantum operation.

S303: A plurality of second direct current electrodes output voltages to transport the operation ion in the corresponding second ion trap to a first ion trap. It should be understood that, in this case, the first ion trap to which the operation ion returns may be the original first ion trap or another first ion trap.

Optionally, after the operation ion returns to the first ion trap, the first optical waveguide may transmit a cooling laser to irradiate the ancillary ion, to implement cooperative cooling on the operation ion.

S301 to D303 are repeated until a quantum computing process is completed, and the method may further include the following steps.

S304: A quantum state of the operation ion is read, to obtain a quantum computing result.

Optionally, for example, the operation ion 101 is a Ca ion and the ancillary ion is a Ba ion. An operation procedure of performing quantum computing by using a Ba—Ca ion pair is as follows:

S3011: In the first ion trap, an axis of the Ba—Ca ion pair can rotate on a plane, so that a direction of the Ca ion after rotation faces the second ion trap in which the quantum operation needs to be performed.

S3021: A Ca ion or Ca ions in a single or two adjacent first ion traps is/are moved to a second ion trap between the two first ion traps, and the second optical waveguide transmits a 729 nm operation laser, to implement any single-bit or two-bit quantum operation.

S3031: The Ca ion in the second ion trap is transported back to the first ion trap and is paired with the Ba ion, and then the first optical waveguide transmits the cooling laser to implement cooperative cooling on the Ba ion.

S3041: The Ca ion is rotated, so that a direction can adapt to a next quantum operation.

S3011 to S3041 are repeated until the quantum computing process is completed.

S305: In the first ion trap, a quantum state of the Ba ion may be read through the first optical waveguide, to measure a quantum state of the Ca ion to complete quantum measurement.

Optionally, quantum measurement may be completed by using an imaging module in a quantum physical computing system.

Optionally, a quantum operation process performed by the operation ion in the second ion trap is as follows:

Two Ca ions in at least one second alternating current electrode are prepared to ground states (SS) of the Ca ions. In this case, vibration modes of the two Ca ions are assumed to be n. Then, lasers of around 729 nm are applied to the two Ca ions through the second optical waveguide. Frequencies of the two beams of lasers are respectively frequencies of increasing/decreasing a vibration mode, namely, n+1/n−1. Generally, a phonon frequency is about 1 MHz. Therefore, the laser frequency of 729 nm needs to be tuned on by only 1 MHz, and an intensity of interaction between the operation laser from n to n+1 and the Ca ion may be:

$$n \to n+1 : (\sqrt{n+1}\Omega\eta)^2/(\delta-v)$$

Intensity of interaction between the operation laser from n to n−1 and the Ca ion may be:

$$n \to n-1 : (\sqrt{n}\Omega\eta)^2/(v-\delta)$$

n is a quantity of phonons of the ion trap. $\Omega$ is interaction intensity when the laser and the ion resonate (the quantity n of phonons). $v$ is a phonon frequency. $\eta$ is a coupling (Lamb-Dicke) constant, used for describing a relationship between ion vibration and a laser wavelength. A smaller value indicates smaller ion vibration, $\delta$ is detuning of interaction of the laser and phonon mode.

Intensity of interaction between the two beams of operation lasers with different wavelengths and the Ca ions may be:

$$\chi = \frac{\Omega^2 \eta^2 v}{2(v^2 - \delta^2)}$$

It can be learned that the intensity of interaction between the operation laser and the Ca ion is irrelevant to the quantity of phonons. After the operation laser acts for a specific time t, the two calcium ions enter an entangled state SS+DD, so that a two-bit quantum logic gate is implemented. The specific time t should satisfy the following formula:

$$\chi t = \frac{\pi}{8}$$

Figure 9:
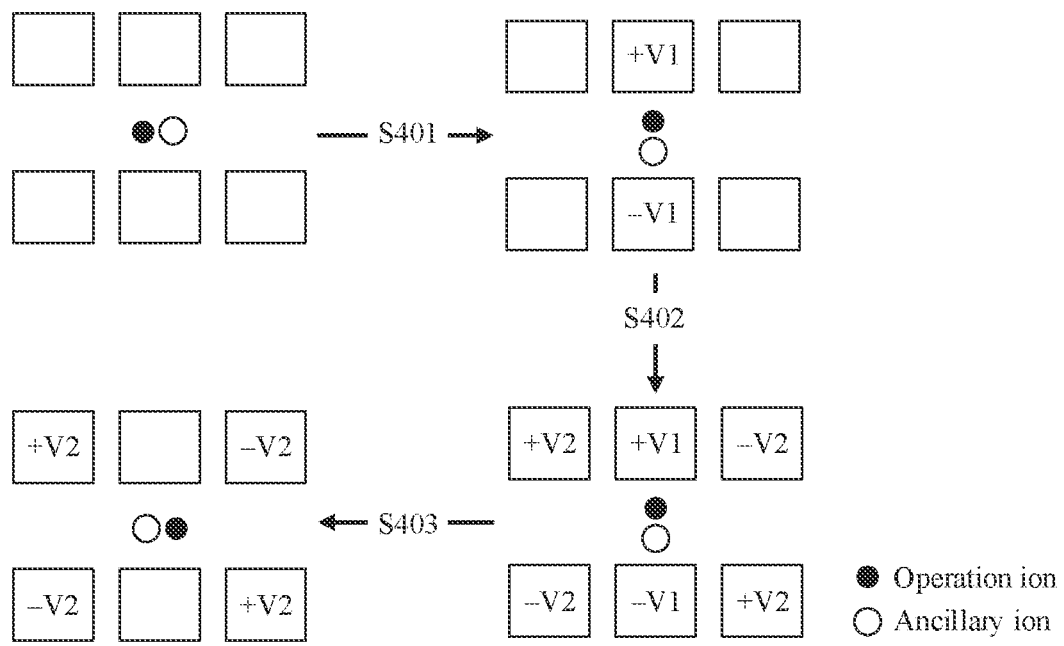
FIG. 9 is a schematic diagram of controlling ion rotation according to an embodiment of this application.

FIG. 9 is a schematic diagram of controlling ion rotation according to an embodiment of this application.

It should be understood that a quantity of electrodes used in embodiments of this application is merely used as an example, and the quantity of electrodes is not limited in this application.

As shown in FIG. 9, the first ion trap may store an operation ion and an ancillary ion by using at least one first alternating current electrode and first direct current electrodes. The operation ion and the ancillary ion may be rotated in the following manner.

Optionally, an ion mass of the operation ion may be less than that of the ancillary ion.

Optionally, the operation ion may be a Ca ion or a Be ion, and the ancillary ion may be a Ba ion or an Sr ion.

S401: Electrostatic fields are applied in a radial direction.

After the electrostatic fields applied in the radial direction by the first direct current electrodes are coupled to radial RF potential energy of the at least one first alternating current electrode, the operation ion and the ancillary ion are rebalanced to reach a new energy low point. A heavy ion is biased towards a negative electrode, and a light ion is biased towards a positive electrode. Finally, an axis of the operation ion and the ancillary ion is along a direction in which the electrostatic fields are applied.

S402: Power is supplied to first direct current electrodes on two sides of the electrostatic fields applied in the radial direction.

The operation ion and the ancillary ion have reached a balanced (symmetrical) state in the radial direction, and removing the radial electric fields does not make the ions return to the original states. In this case, to break symmetry, power is supplied to the first direct current electrodes on the two sides of the electrostatic fields applied in the radial direction, and four electrodes are added. In this way, the axis of the operation ion and the ancillary ion deviates from the radial direction. The axis of the operation ion and the ancillary ion has a consistent direction with the negative electrode.

S403: The electrostatic fields applied in the radial direction are removed.

The electrostatic fields applied in the radial direction are removed, so that the operation ion and the ancillary ion are rebalanced in an axial direction. In addition, because the ion mass of the operation ion is different from that of the ancillary ion, the operation ion and the ancillary ion have exchanged locations.

It should be understood that, by performing S401 to S403, it can be ensured that an ion pair of the operation ion and the ancillary ion rotates on a plane by any angle. In this way, the operation ion faces a target direction, namely, a second ion trap in which a quantum operation is to be performed, for a subsequent ion moving operation. For example, the first direct current electrode may output a voltage.

Figure 10:
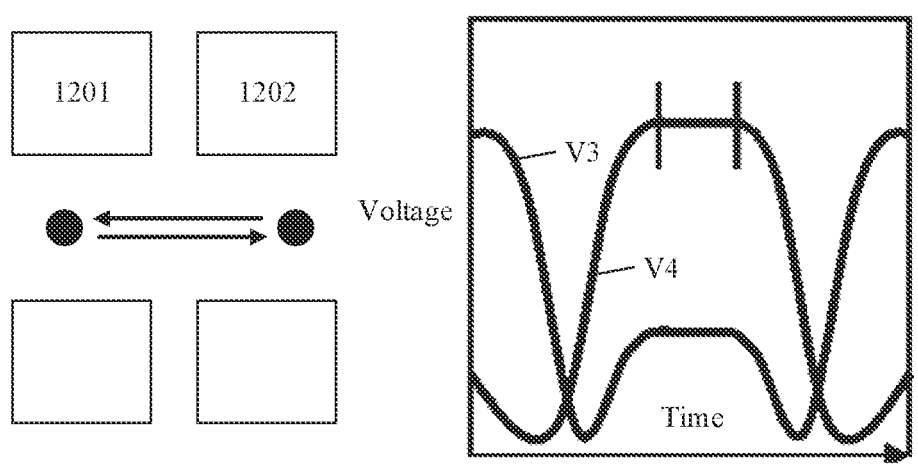
FIG. 10 is a schematic diagram of transporting a single ion according to an embodiment of this application.
Figure 11:
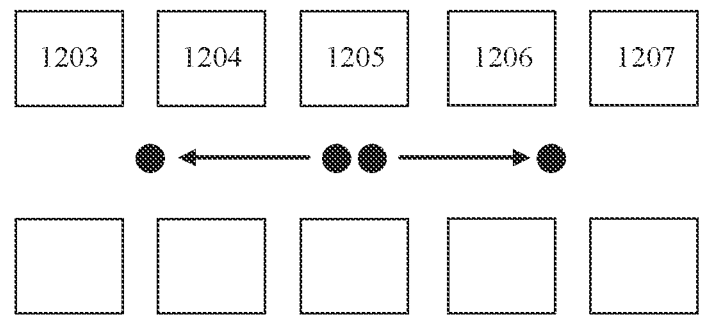
FIG. 11 is a schematic diagram of transporting an ion pair according to an embodiment of this application.

FIG. 10 and FIG. 11 are schematic diagrams of ion transport according to an embodiment of this application.

FIG. 10 is a schematic diagram of transporting a single operation ion by using a plurality of second direct current electrodes in a second ion trap. FIG. 11 is a schematic diagram of separating an operation ion pair and then transporting the operation ion pair in opposite directions by using the plurality of second direct current electrodes in the second ion trap.

As shown in FIG. 10, to move a single operation ion from a left electrode area to a right electrode area in the second ion trap, voltages applied to electrodes need to be quickly changed.

Optionally, a voltage of a first left electrode 1201 is decreased, and a voltage of a first right electrode 1202 is increased. The operation ion senses electric force from left to right, and, therefore moves to the right. When a specific voltage is reached, after a period of time, time symmetric voltages are applied to enable the operation ion to return to an original location. In FIG. 10, V3 is the voltage of the first left electrode 1201, and V4 is the voltage of the first right electrode 1202.

As shown in FIG. 11, to separate an operation ion pair from intermediate electrodes in the second ion trap to two sides, voltages of a plurality of electrodes need to be quickly changed.

Optionally, a voltage of a central electrode 1205 is increased, so that the two ions sense electric field force on two sides. A voltage of a second left electrode 1204 and a voltage of a second right electrode 1206 are decreased, so that area potential energy reaches a lowest point. A voltage of a third left electrode 1203 and a voltage of a third right electrode 1207 are increased, to prevent the operation ions from continuing to move forward. For example, V5, V6, V7, V8, and V9 respectively correspond to voltages of the third left electrode 1203, the second left electrode 1204, the central electrode 1205, the second right electrode 1206, and the third right electrode 1207, and may change from {V5, V6, V7, V8, V9}={2, 0, −2, 0, 2} to {V5, V6, V7, V8, V9}={4, −5, 0, −5, 4}.

It should be understood that the technical solutions shown in FIG. 10 and FIG. 11 may also be applied to an ion channel or a first ion trap for ion transport. This is not limited in this application.

A person skilled in the art may use a different method to implement the described functions for each particular application, but it should not be considered that the implementation goes beyond the scope of this application.

A person skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical form or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An ion trap chip, comprising:
a controller;
a plurality of first ion traps, each first ion trap of the plurality of first ion traps is operated by the controller to be configured to store an operation ion and an ancillary ion, wherein two first ion traps that are adjacent to each other within the plurality of first ion traps form one ion trap group, each first ion trap of the plurality of first ion traps comprises at least one first alternating current electrode and a plurality of first direct current electrodes surrounding the at least one first alternating current electrode such that the operation and ancillary ions are trapped on the alternating current electrode by the potentials from the electrostatic fields generated by the first direct current electrodes;
a plurality of second ion traps, wherein each second ion trap of the plurality of second ion traps corresponds to one ion trap group and is operated by the controller to be configured to perform quantum operations of operation ions stored in a corresponding ion trap group, and each second ion trap is located between two first ion traps in a corresponding ion trap group, wherein operation ions stored in corresponding first ion traps in an ion trap group are transported to a corresponding second ion trap along a straight line, and wherein each second ion trap in an ion trap group is operated by the controller to be configured to store two operation ions transported from two corresponding first ion traps; and wherein the ancillary ion is a strontium ion or a barium ion and the operation ion is a calcium ion or a beryllium ion.

2. The ion trap chip according to claim 1, wherein the ion trap chip further comprises:
a plurality of ion channels, wherein each ion channel of the plurality of ion channels is located between a second ion trap and a first ion trap in a corresponding ion trap group, and wherein each ion channel is used for transporting operation ions in a corresponding ion trap group.

3. The ion trap chip according to claim 2, wherein the ion trap chip further comprises:
a substrate, wherein the plurality of first ion traps, the plurality of second ion traps, and the plurality of ion channels are all located on a surface of the substrate; and
a plurality of first optical waveguides located inside the substrate, wherein the plurality of first optical waveguides are configured to transmit a cooling laser to irradiate an ancillary ion.

4. The ion trap chip according to claim 3, wherein the ancillary ion is a strontium ion or a barium ion.

5. The ion trap chip according to claim 3, wherein the substrate is prepared by stacking a plurality of silicon dioxide baseboards, and the plurality of first optical waveguides are located between any two adjacent silicon dioxide baseboards.

6. The ion trap chip according to claim 3, wherein:
the at least one first alternating current electrode and the plurality of first direct current electrodes are located on the surface of the substrate; and
the at least one first alternating current electrode and the plurality of first direct current electrodes are configured to store an operation ion and an ancillary ion, and the plurality of first direct current electrodes are further configured to control the operation ion and the ancillary ion to rotate, wherein the operation ion is rotated to a target direction.

7. The ion trap chip according to claim 2, wherein the ion trap chip further comprises:
a substrate, wherein the plurality of first ion traps, the plurality of second ion traps, and the plurality of ion channels are all located on a surface of the substrate; and
a plurality of second optical waveguides located inside the substrate, wherein the plurality of second optical waveguides are configured to transmit an operation laser to irradiate operation ions in a second ion trap.

8. The ion trap chip according to claim 7, wherein the substrate is prepared by stacking a plurality of silicon dioxide baseboards, and the plurality of second optical waveguides are located between any two adjacent silicon dioxide baseboards.

9. The ion trap chip according to claim 7, wherein:
each second ion trap comprises at least one second alternating current electrode and a plurality of second direct current electrodes, the at least one second alternating current electrode and the plurality of second direct current electrodes are located on the surface of the substrate, and the plurality of second direct current electrodes are located on two sides of the at least one second alternating current electrode; and
the at least one second alternating current electrode and the plurality of second direct current electrodes are configured to store operation ions in a second ion trap, and the plurality of second direct current electrodes are further configured to transport the operation ions in the second ion trap.

10. The ion trap chip according to claim 1, wherein the operation ion is a calcium ion or a beryllium ion.

11. A quantum computing method applied to an ion trap chip, wherein the ion trap chip comprises a plurality of first ion traps, a plurality of second ion traps, a plurality of first optical waveguides, and a plurality of second optical waveguides, wherein each first ion trap of the plurality of first ion traps is configured to store an operation ion and an ancillary ion, wherein two first ion traps that are adjacent to each other within the plurality of first ion traps form one ion trap group, and each second ion trap of the plurality of second ion traps corresponds to one ion trap group, wherein operation ions stored in first ion traps in an ion trap group are transported to a corresponding second ion trap along a straight line, each second ion trap in an ion trap group is configured to store two operation ions transported from two corresponding first ion trap, each first ion trap of the plurality of first ion traps comprises at least one first alternating current electrode and a plurality of first direct current electrodes surrounding the at least one first alternating current electrode, and each second ion trap comprises a plurality of second direct current electrodes, such that the operation and ancillary ions are trapped on the alternating current electrode by the potentials from the electrostatic fields generated by the first direct current electrodes, wherein the ancillary ion is a strontium ion or a barium ion and the operation ion is a calcium ion or a beryllium ion; and the quantum computing method comprises:
outputting, by a plurality of first direct current electrodes in a first ion trap, voltages to transport an operation ion in the first ion trap to a corresponding second ion trap;
transmitting, by a second optical waveguide, an operation laser to irradiate the operation ion; and
outputting, by a plurality of second direct current electrodes in the corresponding second ion trap, voltages to transport the operation ion in the corresponding second ion trap to the first ion trap.

12. The quantum computing method according to claim 11, wherein after the transporting the operation ion in the corresponding second ion trap to the first ion trap, the quantum computing method further comprises:
reading a quantum state of the operation ion.

13. The quantum computing method according to claim 11, wherein:
the outputting, by the plurality of first direct current electrodes in the first ion trap, voltages to transport the operation ion in the first ion trap to the corresponding second ion trap comprises:
outputting, by the plurality of first direct current electrodes in the first ion trap, the voltages to rotate the ancillary ion and the operation ion, wherein the operation ion is rotated to a target direction and is transported to the corresponding second ion trap along the target direction.

14. The quantum computing method according to claim 13, wherein after the outputting, by the plurality of second direct current electrodes in the corresponding second ion trap, voltages to transport the operation ion in the corresponding second ion trap to the first ion trap, the quantum computing method comprises:

transmitting, by a first optical waveguide, a cooling laser to irradiate the ancillary ion.

15. A non-transitory computer storage medium, wherein the non-transitory computer storage medium stores computer-executable instructions, and when the computer-executable instructions are invoked by a computer, the computer is enabled to perform a method applied to an ion trap chip, wherein the ion trap chip comprises a plurality of first ion traps, a plurality of second ion traps, a plurality of first optical waveguides, and a plurality of second optical waveguides, wherein each first ion trap of the plurality of first ion traps is configured to store an operation ion and an ancillary ion, wherein two first ion traps that are adjacent to each other within the plurality of first ion traps form one ion trap group, and each second ion trap of the plurality of second ion traps corresponds to one ion trap group, wherein operation ions stored in first ion traps in an ion trap group are transported to a corresponding second ion trap along a straight line, each second ion trap in an ion trap group is configured to store two operation ions transported from two corresponding first ion traps, each first ion trap of the plurality of first ion traps comprises at least one first alternating current electrode and a plurality of first direct current electrodes surrounding the at least one first alternating current electrode, and each second ion trap comprises a plurality of second direct current electrodes, such that the operation and ancillary ions are trapped on the alternating current electrode by the potentials from the electrostatic fields generated by the first direct current electrodes, wherein the ancillary ion is a strontium ion or a barium ion and the operation ion is a calcium ion or a beryllium ion; and the method comprises:

outputting, by a plurality of first direct current electrodes in a first ion trap, voltages to transport an operation ion in the first ion trap to a corresponding second ion trap;

transmitting, by a second optical waveguide, an operation laser to irradiate the operation ion; and outputting, by a plurality of second direct current electrodes in the corresponding second ion trap, voltages to transport the operation ion in the corresponding second ion trap to the first ion trap.

16. The non-transitory computer storage medium according to claim 15, wherein after the transporting the operation ion in the corresponding second ion trap to the first ion trap, the method further comprises:

reading a quantum state of the operation ion.

17. A quantum computing system, wherein the quantum computing system comprises at least one ion trap chip and at least one controller, wherein the at least one controller is configured to control the ion trap chip, wherein the ion trap chip comprises:

a plurality of first ion traps, each first ion trap of the plurality of first ion traps is configured to store an operation ion and an ancillary ion, wherein two first ion traps that are adjacent to each other within the plurality of first ion traps form one ion trap group, each first ion trap of the plurality of first ion traps comprises at least one first alternating current electrode and a plurality of first direct current electrodes surrounding the at least one first alternating current electrode; and a plurality of second ion traps, wherein each second ion trap of the plurality of second ion traps corresponds to one ion trap group and is configured to perform quantum operations of operation ions stored in a corresponding ion trap group, and each second ion trap is located between two first ion traps in a corresponding ion trap group, wherein operation ions stored in corresponding first ion traps in an ion trap group are transported to a corresponding second ion trap along a straight line, and wherein each second ion trap in an ion trap group is configured to store two operation ions transported from two corresponding first ion traps; such that the operation and ancillary ions are trapped on the alternating current electrode by the potentials from the electrostatic fields generated by the first direct current electrodes, wherein the ancillary ion is a strontium ion or a barium ion and the operation ion is a calcium ion or a beryllium ion.

18. The quantum computing system according to claim 17, wherein the ion trap chip further comprises:

a plurality of ion channels, wherein each ion channel of the plurality of ion channels is located between a second ion trap and a first ion trap in a corresponding ion trap group, and wherein each ion channel is used for transporting operation ions in a corresponding ion trap group.

19. The quantum computing system according to claim 18, wherein the ion trap chip further comprises:

a substrate, wherein the plurality of first ion traps, the plurality of second ion traps, and the plurality of ion channels are all located on a surface of the substrate; and a plurality of first optical waveguides located inside the substrate, wherein the plurality of first optical waveguides are configured to transmit a cooling laser to irradiate an ancillary ion.

* * * * *